United States Patent
Kim et al.

(10) Patent No.: US 8,522,124 B2
(45) Date of Patent: Aug. 27, 2013

(54) SEMICONDUCTOR DEVICE AND DECODING METHOD THEREOF

(75) Inventors: Yong-June Kim, Seoul (KR); Jun-Jin Kong, Yongin-si (KR); Young-Hwan Lee, Suwon-si (KR); Jae-Hong Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 219 days.

(21) Appl. No.: 13/069,834

(22) Filed: Mar. 23, 2011

(65) Prior Publication Data

US 2011/0246853 A1   Oct. 6, 2011

(30) Foreign Application Priority Data

Apr. 2, 2010   (KR) .................. 10-2010-0030507

(51) Int. Cl.
*G06F 11/00*   (2006.01)
*H03M 13/00*   (2006.01)

(52) U.S. Cl.
USPC ........... 714/801; 714/752; 714/755; 714/758; 714/768; 714/774; 375/340

(58) Field of Classification Search
USPC ................. 714/752, 755, 758, 768, 774, 801; 375/340
See application file for complete search history.

(56) References Cited

U.S. PATENT DOCUMENTS

| | | | |
|---|---|---|---|
| 6,182,264 B1 * | 1/2001 | Ott ............................... | 714/774 |
| 6,490,243 B1 * | 12/2002 | Tanaka et al. .................. | 370/216 |
| 2003/0196157 A1 * | 10/2003 | Kern et al. ..................... | 714/768 |
| 2005/0193312 A1 * | 9/2005 | Smith et al. ................... | 714/755 |
| 2005/0286657 A1 * | 12/2005 | Thyssen et al. ............... | 375/340 |
| 2009/0013234 A1 | 1/2009 | Radke | |

FOREIGN PATENT DOCUMENTS

| | | |
|---|---|---|
| JP | 2007-142622 | 6/2007 |
| KR | 1020080088030 A | 10/2008 |

* cited by examiner

*Primary Examiner* — Sam Rizk

(74) *Attorney, Agent, or Firm* — F. Chau & Associates, LLC

(57) ABSTRACT

An error control coding (ECC) circuit includes a first decoder, a second decoder, and a controller. The first decoder receives encoded data comprising a first parity and a second parity. The first decoder decodes the encoded data to a first code by using the first parity. The second decoder is connected to the first decoder. The second decoder is configured to decode the encoded data when the first decoder is deactivated and decode the first code using the second parity when the first decoder is deactivated. The controller transmits a control signal to the first decoder and the second decoder to control the first decoder and the second decoder.

22 Claims, 13 Drawing Sheets

FIG. 12

| | | |
|---|---|---|
| (a) | INNER DECODER | OUTER DECODER |
| | SOFT DECISION | HARD DECISION |

| | | |
|---|---|---|
| (b) | INNER DECODER | OUTER DECODER |
| | SOFT DECISION | SOFT DECISION |

| | | |
|---|---|---|
| (c) | INNER DECODER | OUTER DECODER |
| | HARD DECISION | HARD DECISION |

SEMICONDUCTOR DEVICE AND DECODING METHOD THEREOF

CROSS-REFERENCE TO RELATED APPLICATION

This application priority to Korean Patent Application No. 10-2010-0030507, filed on Apr. 2, 2010, in the Korean Intellectual Property Office, the disclosure of which is incorporated by reference in its entirety herein.

BACKGROUND

1. Technical Field

Exemplary embodiments of the inventive concept relate to a semiconductor device and a decoding method thereof, and more particularly, to a semiconductor device, which may improve the performance of error control coding (ECC) and reduce power consumption, and a decoding method of the semiconductor device.

2. Discussion of Related Art

Electronic devices may include one or more semiconductor devices. High-speed communication may be performed internally between elements within a semiconductor device or externally among the semiconductor devices themselves. Data that is received during one of these communications may contain an error. Thus, some form of error detection and correction may be necessary to ensure that the devices operate properly. However, conventional error detection and correction is a time consuming process that may require excessive amounts of power.

SUMMARY

At least one embodiment of the inventive concept provides a semiconductor device, which may improve bit error rate (BER) performance of error control coding (ECC) and reduce power consumption, and a method of decoding the data of the semiconductor device.

According to an exemplary embodiment of the inventive concept, an error control coding (ECC) circuit includes a first decoder, a second decoder, and a controller. The first decoder receives encoded data comprising a first parity and a second parity and decodes the encoded data to a first code by using the first parity. The second decoder is connected to the first decoder. The second decoder decodes the encoded data when the first decoder is deactivated and decodes the first code by using the second parity when the first decoder is activated. The controller transmits a control signal to the first decoder and the second decoder that controls the first decoder and the second decoder.

The control signal may activate the first decoder when a decoding operation of the second decoder fails. The first decoder and the second decoder may be simultaneously activated by the control signal. The controller may deactivate the first decoder using the control signal when a decoding operation of the second decoder is successfully performed.

The first decoder may decode a plurality of sub-information in series or in parallel. The plurality of sub-information may be obtained by dividing information included in the encoded data into distinct parts excluding the parities. When the plurality of sub-information is decoded in parallel, the first decoder comprises a plurality of sub-decoders that decode each of the respective parts of the sub-information. All the sub-decoders may be deactivated based on a state of the control signal or at least one of the sub-decoders may activated (i.e., the others are deactivated) based on the state of the control signal.

The controller may set the sub-information to be decoded of the plurality of sub-information based on a channel environment parameter. The controller may set the sub-information to be decoded of the plurality of sub-information, according to a number of error bits included in each of the sub-information.

The ECC circuit may further include a determination unit for determining whether the decoding operation of the second decoder failed or passed.

When a number of error bits of decoded data output from the second decoder is greater than an error correcting capability of the second decoder, the control signal may be set by the controller to activate the first decoder.

The first decoder may perform a decoding operation by one of soft decision and hard decision and the second decoder may perform the decoding operation by one of soft decision and hard decision.

The second decoder may decode the first code when the first decoder is activated by the control signal, and decode the encoded data when the first decoder is deactivated by the control signal. The ECC circuit may be included in a semiconductor device.

According to an exemplary embodiment of the inventive concept, a semiconductor device includes an error control coding (ECC) circuit having an encoding unit and a decoding unit. The encoding unit generates encoded data by sequentially adding a first parity and a second parity to information. The decoding unit includes a first decoder, a second decoder, and a controller. The first decoder receives encoded data comprising a first parity and a second parity and decodes the encoded data to a first code by using the first parity. The second decoder is connected to the first decoder. The second decoder decodes the received encoded data by using the second parity after removing the first parity from the received encoded data or decodes the first code by using the second parity. The controller transmits a control signal to the first decoder and the second decoder to control the first decoder and the second decoder.

The second decoder may decode the first code when the first decoder is activated by the control signal and decode the encoded data when the first decoder is deactivated by the control signal. The controller may set the control signal to activate the first decoder when the second decoder fails to decode the encoded data during a previous decoding attempt.

According to an exemplary embodiment of the inventive concept, an error control coding (ECC) circuit includes an encoder comprising an outer encoder and an inner encoder, a decoder comprising an outer decoder, an inner decoder, and a controller, and a channel enabling communication between the encoder and the decoder. The outer encoder receives information from an external source and generates a first encoded code including a second parity and the information. The inner encoder receives the first encoded code and generates a second encoded code including a first parity, the second parity, and the information. The inner decoder receives the second encoded code across the channel and generates a first decoded code by removing the first parity from the second encoded code when activated by a control signal. The outer decoder is configured to decode the first decoded code based on the second parity when the first decoded code is received from the inner decoder and decode the first encoded code otherwise. The controller is configured to set the control signal to activate the inner decoder when the controller receives an indicator signal from the outer decoder indicating a decoding of the outer decoder is a failure and set the control signal to deactivate the inner decoder when the indicator signal indicates that a decoding of the outer decoder current decoding is a success.

The ECC circuit may further include a channel memory connected along the channel, where the second encoded code is stored in the channel memory temporarily. The inner decoder may be comprised of a plurality of decoders that are chained together such that an output of a current one of the decoders is fed as input to a next one of the decoders. When a number of error bits of decoded data output from the outer decoder is greater than an error correcting capability of the outer decoder, the control signal may be set by the controller to activate the inner decoder.

According to an exemplary embodiment of the inventive concept, a method of operating an ECC circuit includes decoding information by a second decoder of the ECC circuit, determining whether the decoding has been successful, and outputting the decoded information if the decoding was successful; however if the decoding was not successful, the method includes activating the first decoder of the ECC circuit, decoding the information by the $1^{st}$ decoder, decoding an output of the first decoder by the second decoder, deactivating the $1^{st}$ decoder, and outputting the decoded information.

BRIEF DESCRIPTION OF THE DRAWINGS

Exemplary embodiments of the inventive concept will be more clearly understood from the following detailed description taken in conjunction with the accompanying drawings in which:

FIG. 12 illustrates exemplary types of the decoders of FIG. 8;

DETAILED DESCRIPTION OF EXEMPLARY EMBODIMENTS

Figure 1:
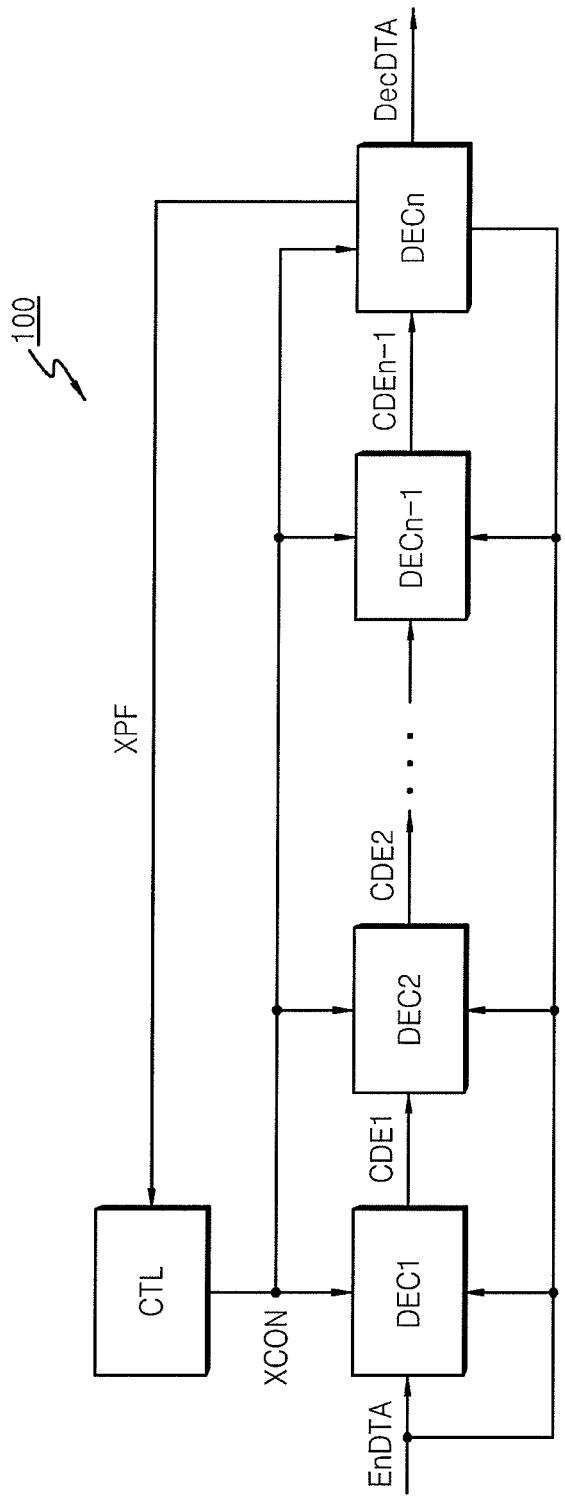
FIG. 1 illustrates a decoding unit included in an error control coding (ECC) block, according to an exemplary embodiment of the inventive concept.

The inventive concept will now be described more fully with reference to the accompanying drawings, in which exemplary embodiments thereof are illustrated. In the drawings, like reference numerals denote like elements.

FIG. 1 illustrates a decoding unit 100 included in an error control coding (ECC) block, according to an exemplary embodiment of the inventive concept. Referring to FIG. 1, the decoding unit 100 includes a plurality of first decoders DEC1, DEC2, . . . , and DECn−1, a second decoder DECn, and a controller CTL.

The first decoders DEC1, DEC2, . . . , and DECn−1 are sequentially connected to each other such that an output of a previous decoder is fed to a next decoder. The first decoders DEC1, DEC2, . . . , and DECn−1 may perform decoding operations based on decoding results of a previous decoder. For example, the decoder DEC2 decodes a code CDE1 decoded by the decoder DEC1 and outputs a code CDE2. However, the decoder DEC1, which is the first one of the first decoders DEC1, DEC2, . . . , and DECn−1 may receive encoded data EnDTA from a source external to the decoding unit 100 and decode the received encoded data EnDTA.

The second decoder DECn is connected to the last one of the first decoders DECn−1. The second decoder DECn decodes the code CDEn−1 decoded by the last one of the first decoders DECn−1 and may output decoded data DecDTA including information Inf.

Decoding operations of the first decoders DEC1, DEC2, . . . , and DECn−1 and of the second decoder DECn will be discussed below with respect to FIG. 2, which illustrates data and codes, which may be operated on by FIG. 1.

Figure 2:
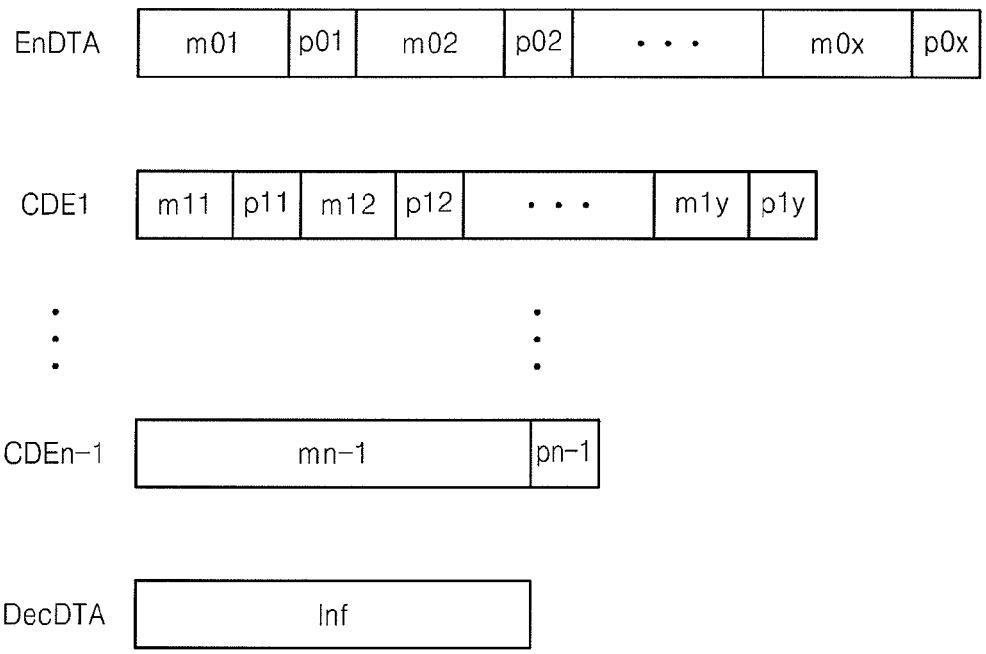
FIG. 2 illustrates data and codes, which may be used by FIG. 1 according to an exemplary embodiment of the invention concept.

Referring to FIG. 2, information Inf encoded by the encoded data EnDTA may be divided into a plurality of sub-information m01, m02, . . . , and m0x. The encoded data EnDTA may include parities p01, p02, . . . , and p0x (e.g., parity bits), which are encoding results for the sub-information m01, m02, . . . , and m0x, respectively. The first decoder DEC1 may perform a decoding operation based on at least one parity from among the parities p01, p02, . . . , and p0x of the encoded data EnDTA and output a code CDE1. The first decoder DEC2 may perform a decoding operation based on at least one parity from among parities p11, p12, . . . , and p1y of the code CDE1 and output a code CDE2. Similarly, the last one of the first decoders DECn−1 may perform a decoding operation and output a code CDEn−1 including one parity pn−1.

Figure 3:
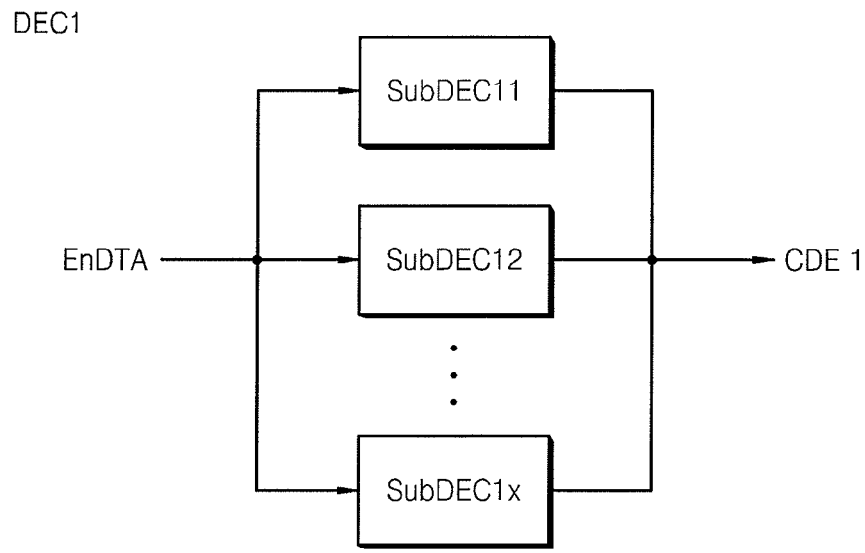
FIG. 3 illustrates a decoder of FIG. 1 according to an exemplary embodiment of the invention.

The first decoders DEC1, DEC2, . . . , and DECn−1 may each include a plurality of sub-decoders to decode the sub-information m01, m02, . . . , and m0x in parallel. FIG. 3 illustrates one or more of the first decoders of FIG. 1 according to an exemplary embodiment of the inventive concept. In particular, in FIG. 3, the first decoder DEC1, which is the first of the first decoders DEC1, DEC2, . . . , and DECn−1 is illustrated.

Referring to FIG. 3, the decoder DEC1 may include sub-decoders SubDEC11, SubDEC12, . . . , and SubDEC1x, wherein the number of the sub-decoders SubDEC11, SubDEC12, . . . , and SubDEC1x corresponds to the number of the sub-information m01, m02, . . . , and m0x included in the encoded data EnDTA. However, the inventive concept is not limited thereto and each of the sub-decoders SubDEC11, SubDEC12, . . . , and SubDEC1x may sequentially decode a plurality of sub-information m01, m02, . . . , and m0x. When a sub-decoder is used to decode multiple sub-information, a register (not illustrated) may be further included in the decoding unit 100 to temporarily store previously decoded sub-information.

Referring back to FIG. 2, the second decoder DECn of FIG. 1 may decode the code CDEn−1 decoded by the last of the first decoders DECn−1 located at the end of the first decoders DEC1, DEC2, . . . , and DECn−1 and output the decoded data DecDTA only including the information Inf.

Referring back to FIG. 1, the first decoders DEC1, DEC2, . . . , and DECn−1 and the second decoder DECn according to an embodiment of the inventive concept may each receive the encoded data EnDTA. For example, the first decoders DEC1, DEC2, . . . , and DECn−1 and the second decoder DECn of FIG. 1 may each decode codes output from a previous decoder or decode codes by receiving the encoded data EnDTA. In at least one embodiment of the inventive concept, the first decoder DEC1 located at the front of the first decoders DEC1, DEC2, . . . , and DECn−1 always performs a decoding operation by receiving the encoded data EnDTA.

Whether a decoder decodes the codes output from a previous decoder or decodes by receiving the encoded data EnDTA may be determined by a control signal XCON. The control signal XCON is generated by the controller CTL. When the second decoder DECn fails to perform a decoding operation, the controller CTL transmits the control signal XCON to the first decoders DEC1, DEC2, . . . , and DECn−1, and to the second decoder DECn, which controls the second decoder DECn to decode the code CDEn−1 transmitted from the last of the first decoders DECn−1 located at the end of the first decoders DEC1, DEC2, . . . , and DECn−1 and to generate the decoded data DecDTA.

In an alternate embodiment of the inventive concept, the control signal XCON is generated for the second decoder DECn to decode the code CDE1 or code CDE2 output from the decoder DEC1 or decoder DEC2, instead of the code output from the last of the first decoders DECn−1 located at the end of the first decoders DEC1, DEC2, . . . , and DECn−1.

Figure 4:
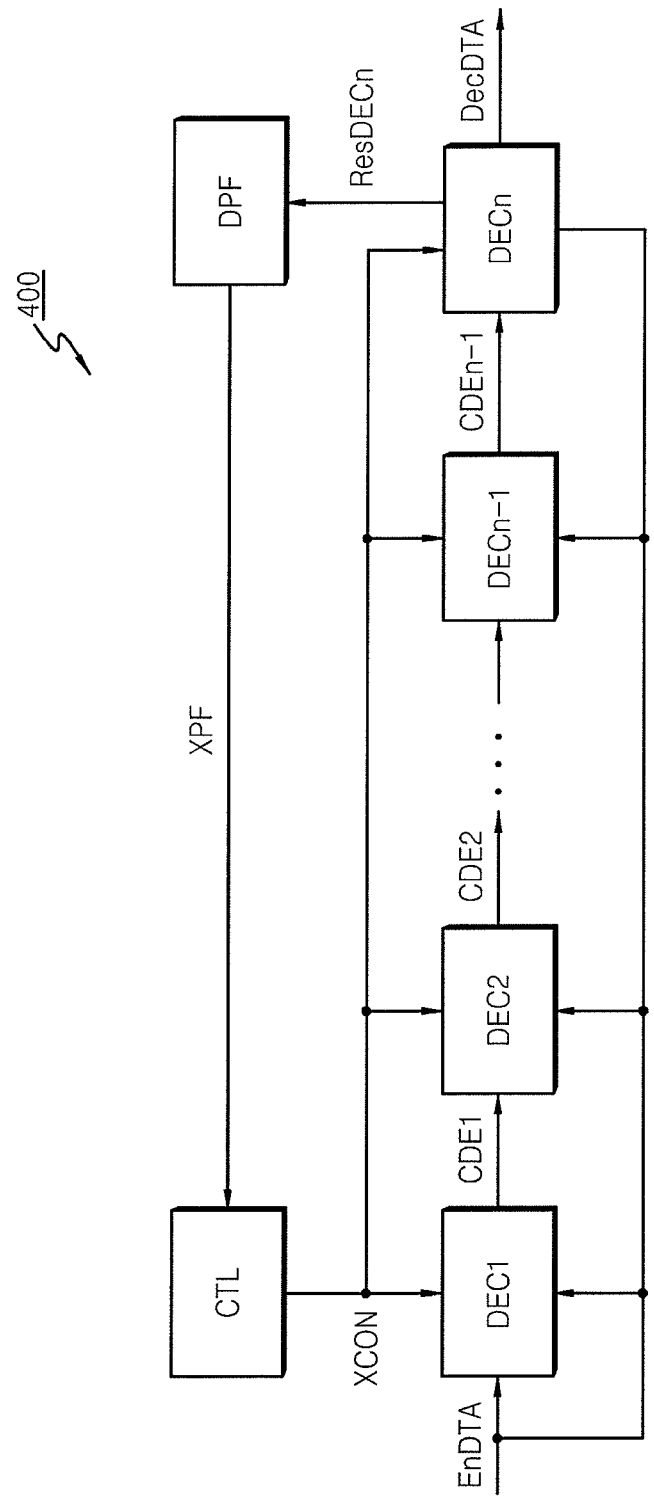
FIG. 4 illustrates a decoding unit included in an ECC block, according to an exemplary embodiment of the inventive concept.

Whether the second decoder DECn fails to perform the decoding operation may be determined by the controller CTL. However, the inventive concept is not limited thereto. FIG. 4 illustrates a decoding unit 400 included in an ECC block, according to an exemplary embodiment of the inventive concept. Referring to FIG. 4, a determination unit DPF may be further included in the decoding unit 400, in addition to the controller CTL, wherein the determination unit DPF receives a decoding result ResDECn of the second decoder DECn and determines whether the decoding operation of the second decoder DECn failed or passed. The determination unit DPF may transmit a determination result XPF to the controller CTL.

Referring to FIG. 1 or FIG. 4, while the first decoders DEC1, DEC2, . . . , and DECn−1 are deactivated, the second decoder DECn may directly decode the encoded data EnDTA and generate the decoded data DecDTA. Here, if the decoding operation of the second decoder DECn fails, the controller CTL may activate a part or all of the first decoders DEC1, DEC2, . . . , and DECn−1 by using the control signal XCON. For example, the controller CTL may generate the control signal XCON which has a logic level varied according to activation states of the first decoders DEC1, DEC2, . . . , and DECn−1, and the second decoder DECn.

When all of the first decoders DEC1, DEC2, . . . , and DECn−1 are activated, the first decoders DEC1, DEC2, . . . , and DECn−1 each decode codes output from a previous decoder and output the decoded codes. Here, as an exception, the first of the first decoders DEC1 receives the encoded data EnDTA as described above. The second decoder DECn decodes the code CDEn−1 transmitted from the last of the first decoders DECn−1 and generates the decoded data DecDTA. In an alternate embodiment, when the first decoders DEC1, DEC2, . . . , and DECn−1 are selectively activated, the first decoders DEC1, DEC2, . . . , and DECn−1, and the second decoder DECn receive codes decoded by an arbitrary decoder. For example, as described above, the second decoder DECn may decode a code CDE1 or a code CDE2 output from the decoder DEC1 or the decoder DEC2.

If the decoding operation of the second decoder DECn fails, the controller CTL may selectively activate the first decoders DEC1, DEC2, . . . , and DECn−1 based on a channel environment in which the encoded data EnDTA is transmitted. Referring to FIG. 3, the sub-decoders SubDEC11, SubDEC12, . . . , and SubDEC1x may be selectively activated based on a channel environment parameter. The channel environment parameter may be stored in buffer or a register (not shown). When the sub-decoders SubDEC11, SubDEC12, . . . , and SubDEC1x each decode a plurality of sub-information, the number of decoded sub-information may be selectively adjusted. For example, referring to FIG. 3, one sub-decoder may process all x sub-information or sub-information of less than or equal to x, according to the channel environment parameter.

Figure 5:
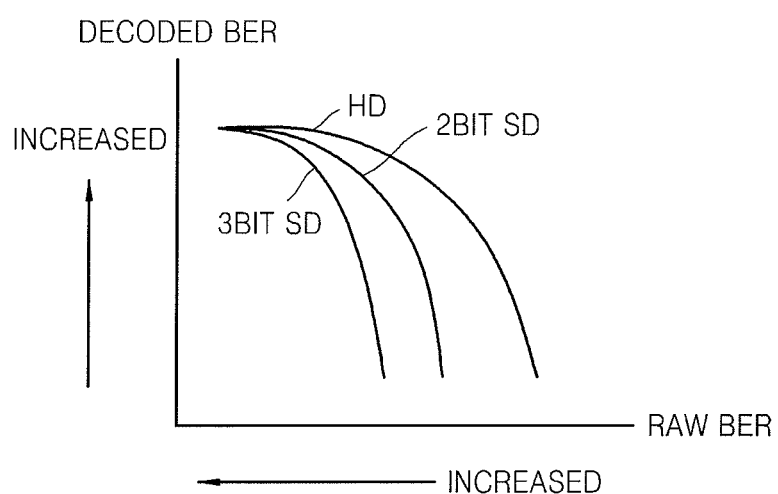
FIG. 5 is a graph showing a change of a bit error ratio (BER) of the decoding unit of FIG. 1 or FIG. 4, according to an exemplary channel environment.

FIG. 5 is a graph showing a change of bit error ratio (BER) of the decoding unit 100 of FIG. 1 according to a channel environment (e.g., the channel environment parameter). Referring to FIG. 5, as a channel environment improves (a decoded BER direction decreases, and a raw BER direction decreases), both a BER of decoded data and a BER of non-decoded data improve. However, as a channel environment deteriorates, BER of decoded data is significantly deteriorated. The influence of a channel environment may vary according to whether the decoder performs the decoding operation by hard decision (HD) decoding (e.g., using binary information) or soft decision (SD) decoding (e.g., using multiple bits of information) such as 2 bit SD or 3 bit SD.

Figure 6:
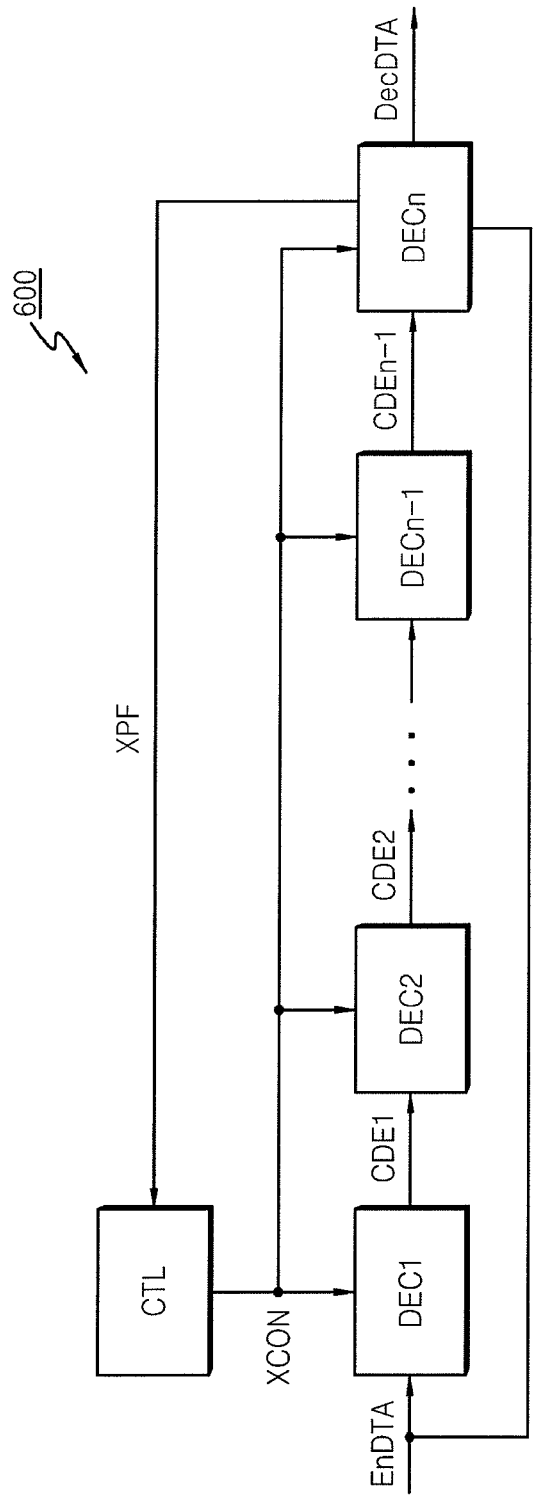
FIG. 6 illustrates a decoding unit included in an ECC block, according to an exemplary embodiment of the inventive concept.

Decoding operations at an initial stage where the first decoders DEC1, DEC2, . . . , and DECn−1 are deactivated and only the second decoder DECn is activated are described above. However, the first decoders DEC1, DEC2, . . . , and DECn−1, and the second decoder DECn according to an alternate embodiment of the inventive concept may be simultaneously activated and may each perform a decoding operation. In this example, as illustrated in FIG. 6, the first decoders DEC1, DEC2, . . . , and DECn−1 included in a decoding unit 600 according to an exemplary embodiment of the inventive concept sequentially receive codes output from a previous decoder or may simultaneously perform decoding operations. Also, a plurality of first decoders from among the first decoders DEC1, DEC2, . . . , and DECn−1 may simultaneously perform decoding operations. When at least two first decoders from among the first decoders DEC1, DEC2, . . . , and DECn−1 simultaneously perform decoding operations, the encoded data EnDTA may be simultaneously input to the first decoders that perform decoding operations, as illustrated in FIG. 1.

The second decoder DECn may receive the encoded data EnDTA simultaneously with the first decoders DEC1, DEC2, . . . , and DECn−1 and decode the received data to obtain the decoded data DecDTA.

When the decoding operation of the second decoder DECn is successfully performed, the controller CTL may deactivate the decoding operations of the activated first decoders DEC1, DEC2, . . . , and DECn-1 by using the control signal XCON. In this example, decoding results of the first decoders DEC1, DEC2, . . . , and DECn-1 are not used.

In an alternate embodiment, when the decoding operation of the second decoder DECn fails, the controller CTL controls the second decoder DECn by using the control signal XCON to receive decoding results (codes) of the first decoders DEC1, DEC2, . . . , and DECn-1 and to perform the decoding operation. Here, when the decoding operation of the second decoder DECn fails, the controller CTL according to an exemplary embodiment of the inventive concept selectively uses the decoding results (codes) of the first decoders DEC1, DEC2, . . . , and DECn-1 based on an error correcting capability of the second decoder DECn and the number of error bits existing in each code. For example, when the number of error bits exceeds the error correcting capability of the second decoder DECn, one or more of the first decoders DEC1, DEC2, . . . , and DECn-1 may be enabled.

Operations of the controller CTL according to the number of error bits included in the codes generated by each of the first decoders DEC1, DEC2, . . . , and DECn-1 are described above. However, the inventive concept is not limited thereto. When the sub-decoders of FIG. 3 are included, the controller CTL may perform a control operation based on the number of error bits included in decoding results of each of the sub-decoders.

As described above, in a decoding unit according to at least one exemplary embodiment of the inventive concept, the second decoder directly decodes the encoded data and generates the decoded data. In a decoding unit according to at least one exemplary embodiment of the inventive concept, when the decoding operation of the second decoder fails, the second decoder performs a decoding operation for a code decoded by the first decoder so that accurate decoding results may be obtained and latency of a plurality of decoders that are sequentially connected to each other may be reduced. Thus, the decoding operation of a semiconductor device may be more rapidly performed and power consumption of the semiconductor device may be reduced.

Accordingly, in a decoding unit according to at least one exemplary embodiment of the inventive concept, when the decoding operation of a final decoder, which outputs finally decoded data, fails, at least one decoder before the final decoder is activated. Also, a plurality of decoders that are sequentially connected to each other may simultaneously operate. When a decoding operation of the decoder located at the end is successfully performed, operations of other decoders are completed. Thus, latency of the plurality of decoders that are sequentially connected to each other may be reduced so that a decoding operation of a semiconductor device may be more rapidly performed and power consumption of the semiconductor device may be reduced.

Figure 7:
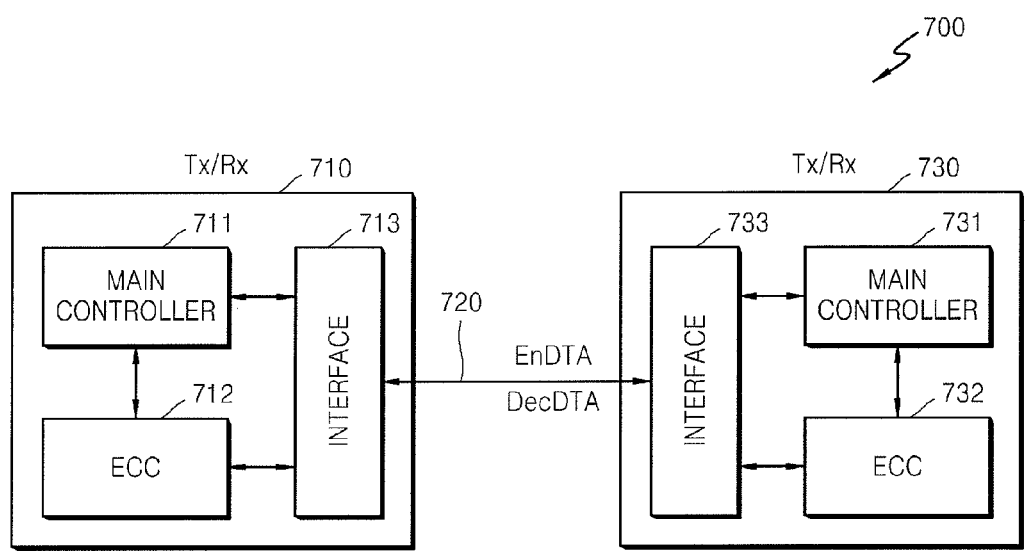
FIG. 7 is a block diagram of an electronic device according to an exemplary embodiment of the inventive concept.

Hereinafter, an electronic device having a first semiconductor device and a second semiconductor device, each having an ECC block including the decoding unit of FIG. 1, FIG. 4, or FIG. 6 is described. FIG. 7 is a block diagram of an electronic device 700 according to an exemplary embodiment of the inventive concept.

Referring to FIG. 7, the electronic device 700 includes a first semiconductor device 710 and a second semiconductor device 730. The first semiconductor device 710 includes a main controller 711, an ECC block 712, and an interface 713. The second semiconductor device 730 includes a main controller 731, an ECC block 732, and an interface 733. The semiconductor devices 710 and 730 receive the encoded data EnDTA and the decoded data DecDTA through a channel 720 between a transmission end and a reception end. The encoded data EnDTA and the decoded data DecDTA are input to the transmission end and the reception end through the interface 713 or the interface 733 and are encoded or decoded in the ECC block 712 or the ECC block 733 according to control of the main controller 711 or the main controller 731.

The electronic device 700 of FIG. 7 may be a memory device or a communication device. The channel 720 of FIG. 7 through which the encoded data EnDTA and the decoded data DecDTA are transmitted may transmit the encoded data EnDTA and the decoded data DecDTA via an electric signal or an optical signal. When the encoded data EnDTA and the decoded data DecDTA are transmitted via an optical signal, the transmission end and the reception end convert the received encoded data EnDTA and decoded data DecDTA into an electric signal and may perform encoding and decoding operations.

Figure 8:
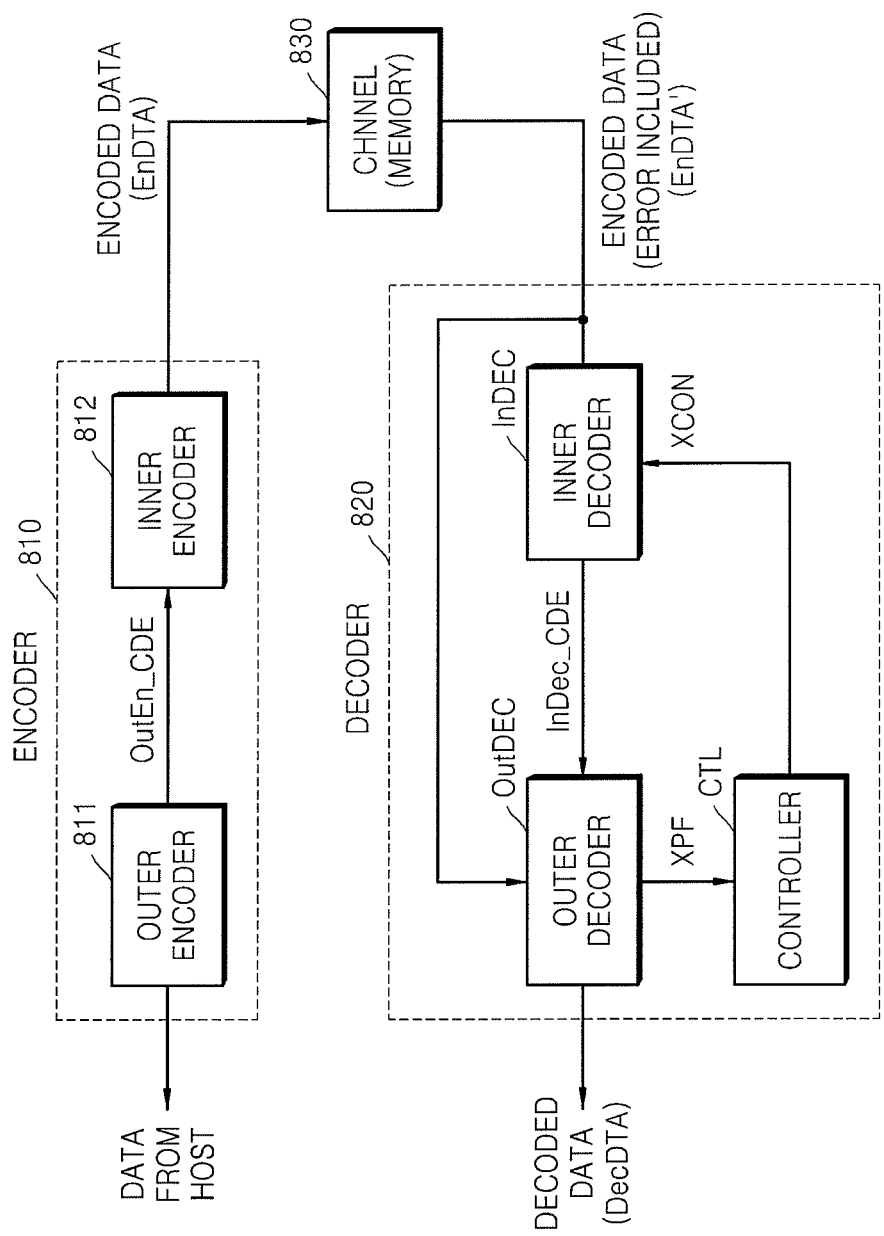
FIG. 8 is a block diagram of an encoding unit and a decoding unit included in an ECC block of FIG. 7 according to an exemplary embodiment of the inventive concept.
Figure 9:
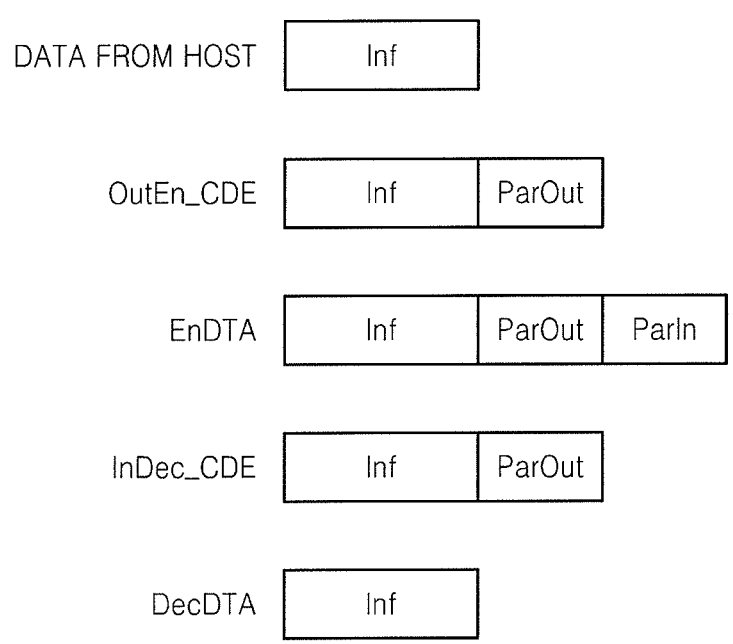
FIG. 9 illustrates examples of data and codes, which may be used in FIG. 8 according to an exemplary embodiment of the invention concept.
Figure 10:
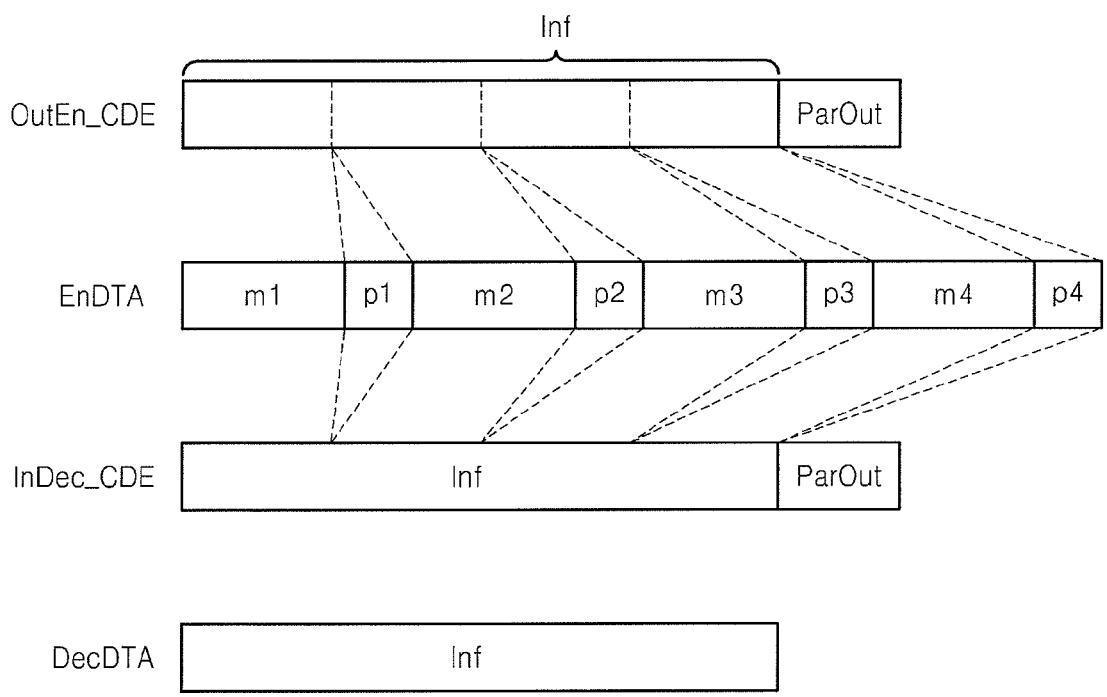
FIG. 10 illustrates examples of data and codes, which may be used in FIG. 8 according to an exemplary embodiment of the inventive concept.

FIG. 8 is a block diagram of an encoding unit 810 and a decoding unit 820, which may be included in the ECC blocks 712 and 732 of FIG. 7. FIG. 9 illustrates examples of data and codes, which may be operated on by the encoding unit 810 and decoding unit 820 of FIG. 8. FIG. 10 illustrates other examples of data and codes, which may be operated on by the units 810 and 820 of FIG. 8.

Referring to FIGS. 7 through 10, the encoder 810 in the transmission end performs a first encoding operation on data (information Inf) (e.g., from a host) through an outer encoder 811 and generates a first encoded code OutEn_CDE in which a second parity ParOut is added to the information Inf. The encoder 810 in the transmission end further performs a second encoding operation on the first encoded code OutEn_CDE through an inner encoder 812 and generates a second encoded code EnDTA, in which a first parity ParIn is added to the first encoded code OutEn_CDE. In other words, the encoded data EnDTA is generated by adding the first parity ParIn and the second parity ParOut to the information Inf. As illustrated in FIG. 10, in the inner encoder 812, the information Inf of the first encoded code OutEn_CDE may be divided into a plurality of sub-information m1, m2, m3, and m4 and encoded. In this example, the encoded data EnDTA may include the plurality of sub-information m1, m2, m3, and m4 and a plurality of first parities p1, p2, p3, and p4 each corresponding to the plurality of sub-information m1, m2, m3, and m4.

The encoded data EnDTA generated by the encoder 810 in the transmission end is transmitted to a channel (or a memory 830) and thus an error may be included therein. For example, encoded data EnDTA' received in a decoder 820 in a reception end may include an error, as described below.

The decoder 820 in the reception end performs a decoding operation for the received encoded data EnDTA'. The decoder 820 in the reception end may perform a first decoding operation through an inner decoder InDEC (first decoder) and generate a first decoded code InDec_CDE in which the first parity ParIn is removed from the received encoded data EnDTA'. Then, the decoder 820 in the reception end may perform a second decoding operation through an outer decoder OutDEC (second decoder) and generate decoded data DecDTA in which the second parity ParOut is removed from the received encoded data EnDTA' and only the information Inf is included.

When the received encoded data EnDTA' includes the plurality of sub-information m1, m2, m3, and m4 and the plurality of first parities p1, p2, p3, and p4 each corresponding to the plurality of sub-information m1, m2, m3, and m4, the inner decoder InDEC may perform a decoding operation for each of the plurality of sub-information m1, m2, m3, and m4 and remove the plurality of first parities p1, p2, p3, and p4 each corresponding to the plurality of sub-information m1, m2, m3, and m4, as illustrated in FIG. 10. Here, the inner decoder InDEC may perform the decoding operation sequentially or in parallel on each of the plurality of sub-information m1, m2, m3, and m4. When the inner decoder InDEC performs the decoding operation in parallel for each of the plurality of sub-information m1, m2, m3, and m4, the inner decoder InDEC may include sub-decoders Sub_InDec1, Sub_InDec2, Sub_InDec3, and Sub_InDec4, as illustrated in FIG. 11, which illustrates the decoding unit 820 of FIG. 8 according to an exemplary embodiment of the inventive concept.

As described above, the outer decoder OutDEC performs the decoding operation by receiving the first decoded code InDec_CDE transmitted from the inner decoder InDEC. However, the inventive concept is not limited thereto.

In an alternate embodiment, the decoder 820 in the reception end may not perform the first decoding operation through the inner decoder InDEC, but may directly transmit the received encoded data EnDTA' to the outer decoder OutDEC so that the outer decoder OutDEC may directly decode the encoded data EnDTA. Here, when the decoding operation of the outer decoder OutDEC fails, the inner decoder InDEC may be activated as described above.

Figure 11:
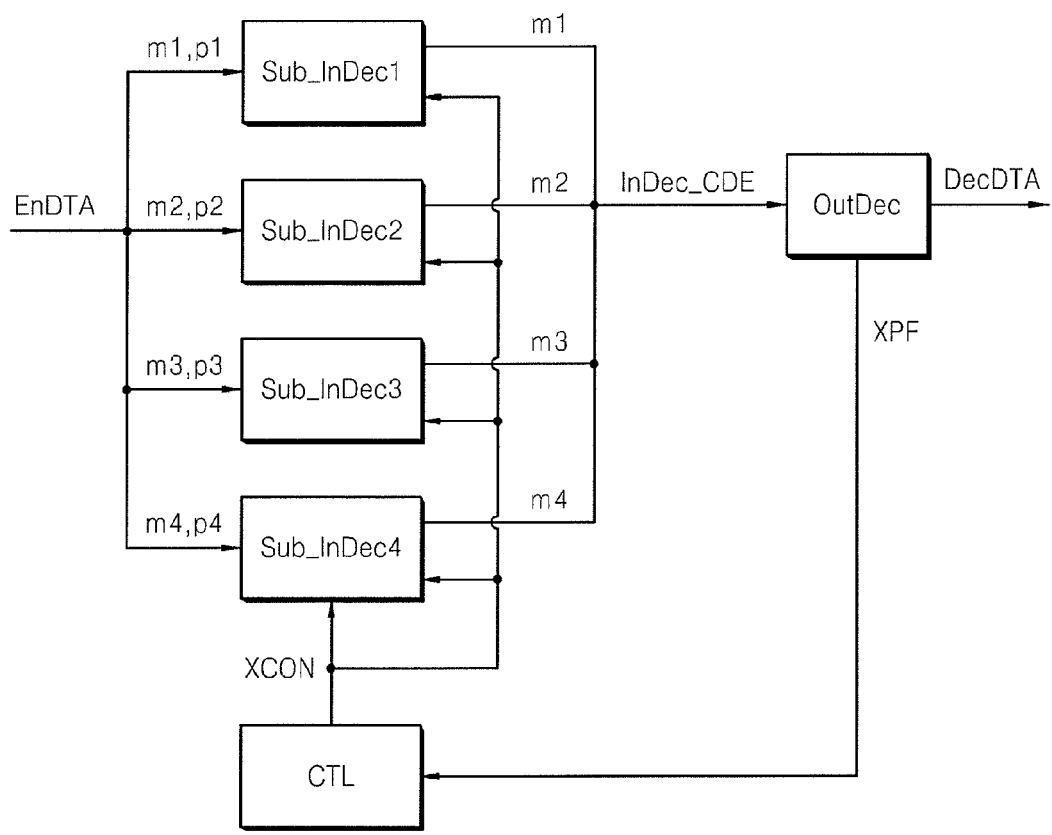
FIG. 11 illustrates the decoding unit of FIG. 8 according to an exemplary embodiment of the inventive concept.

As illustrated in FIG. 11, when the inner decoder InDEC performs the decoding operation for each of the plurality of sub-information m1, m2, m3, and m4, the controller CTL may selectively activate the plurality of sub-decoders Sub_InDec1, Sub_InDec2, Sub_InDec3, and Sub_InDec4 through the control signal XCON.

The inner decoder InDEC and the outer decoder OutDEC may simultaneously perform decoding operations by receiving the encoded data EnDTA. Here, when the decoding operation of the outer decoder OutDEC is successfully performed, the controller CTL may deactivate a decoding operation of the activated inner decoder InDEC through the control signal XCON. In this example, the decoding result of the inner decoder InDEC is not used. In an alternate embodiment, when the decoding operation of the outer decoder OutDEC fails, the controller CTL may control the outer decoder OutDEC through the control signal XCON to receive the decoding result (first decoded code) from the inner decoder InDEC and to perform the decoding operation.

FIG. 12 illustrates exemplary types of decoders, which may be used as the decoder 820 of FIG. 8. As illustrated in (a) of FIG. 12, the inner decoder InDEC of FIG. 8 may perform decoding by SD and the outer decoder OutDEC of FIG. 8 may perform decoding by HD. SD is a decoding method for classifying not only values into "0" or "1" but also values having a high possibility of "0 (or 1)" and values having a low possibility of "0 (or 1)", in consideration of a probability that the values will be generated in the received data, whereas HD is a decoding method for determining data to be decoded to one of "0" and "1". Also, as illustrated in (b) and (c) of FIG. 12, both the inner decoder InDEC and the outer decoder OutDEC may perform decoding by SD or HD.

Figure 13:
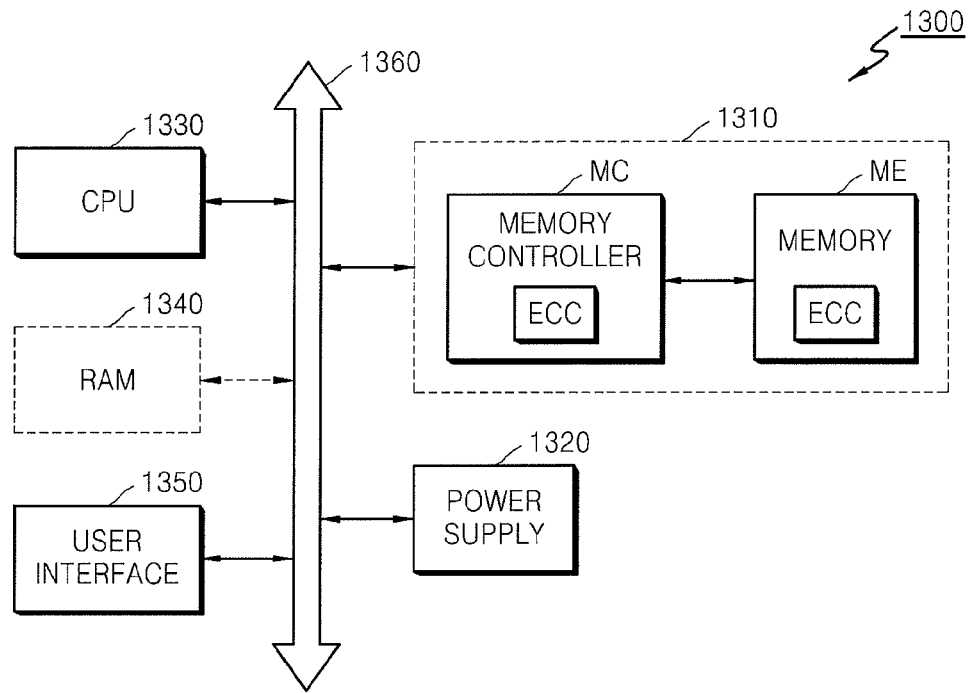
FIG. 13 is a block diagram of a computing system device according to an exemplary embodiment of the inventive concept.

FIG. 13 is a block diagram of a computing system device 1300 according to an embodiment of the inventive concept. The computing system device 1300 includes a microprocessor 1330 (e.g., a CPU) electrically connected to a bus 1360, a user interface 1350, and a semiconductor memory system 1310. The semiconductor memory system 1310 includes a memory controller MC and a memory device ME. The memory device ME may store N-bit data (N is a number greater than or equal to 1) that is processed or to be processed by the microprocessor 1330. The decoding unit 100 of FIG. 1 may be included in an ECC block included in one of the MC and the ME.

The computing system device 1300 according to an exemplary embodiment of the inventive concept may further include a power supply device 1320. When the ME is a flash memory device, the computing system device 1300 according to an exemplary embodiment of the inventive concept may further include a RAM 1340.

When the computing system device 1300 according to an exemplary embodiment of the inventive concept is a mobile device, a battery may be included to provide a driving voltage of the computing system device 1300 and a model such as a baseband chipset may be further included. In other alternate embodiments, an application chipset, a camera image processor (CIS), or a mobile dynamic random access memory (DRAM) may be further included within the computing system device 1300. In at least one embodiment of the inventive concept, the ME is a solid state drive/disk (SSD), which uses a non-volatile memory to store data. However, embodiments of the inventive concept are not limited thereto. For example, the ME could be flash memory or volatile memory.

Figure 14:
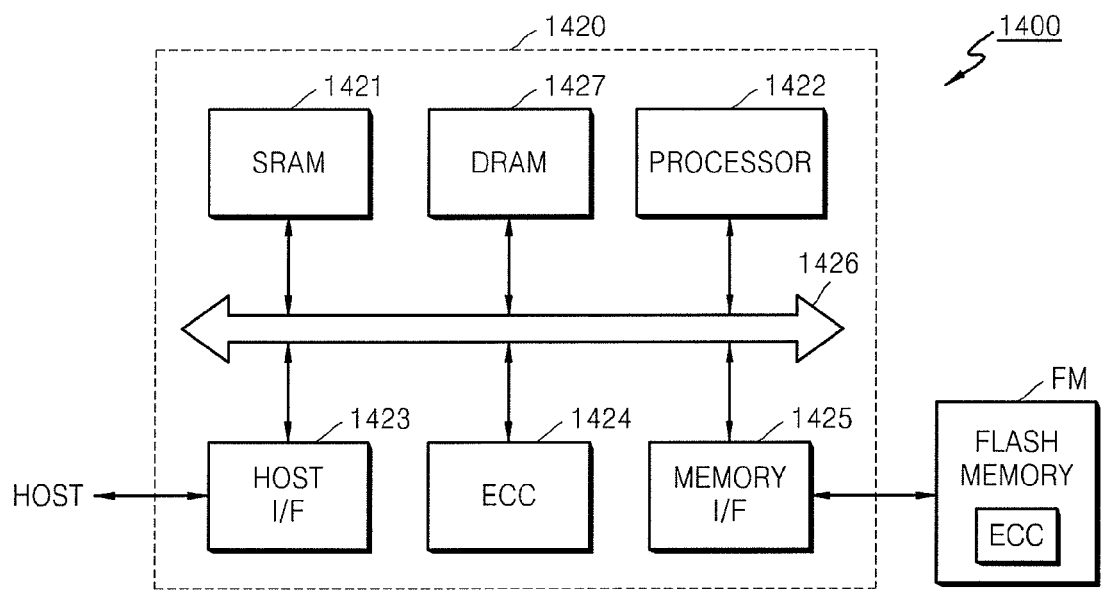
FIG. 14 is a block diagram of a memory card according to an exemplary embodiment of the inventive concept.

FIG. 14 is a block diagram of a memory card 1400 according to an exemplary embodiment of the inventive concept. Referring to FIG. 14, the memory card 1400 includes a controller 1420 and a flash memory FM. The controller 1420 may include an ECC 1424, which includes the decoding unit of FIG. 1, FIG. 4, or FIG. 6. Also, the FM may include an ECC block which includes the decoding unit of FIG. 1, FIG. 4, or FIG. 6. The controller 1420 may be configured to communicate with the outside (for example, a host) through one of various interface protocols such as universal serial bus (USB), multi media card (MMC), peripheral component interconnect-express (PCI-E), serial advanced technology attachment (SATA), parallel ATA (PATA), small computer system interface (SCSI), enhanced small device interface (ESDI), and integrated drive electronics (IDE). The memory card 1400 may also include a processor 1422, a static random access memory (SRAM) 1421, a HOST interface (I/F) 1423, a memory I/F 1425, and a bus 1426.

Figure 15:
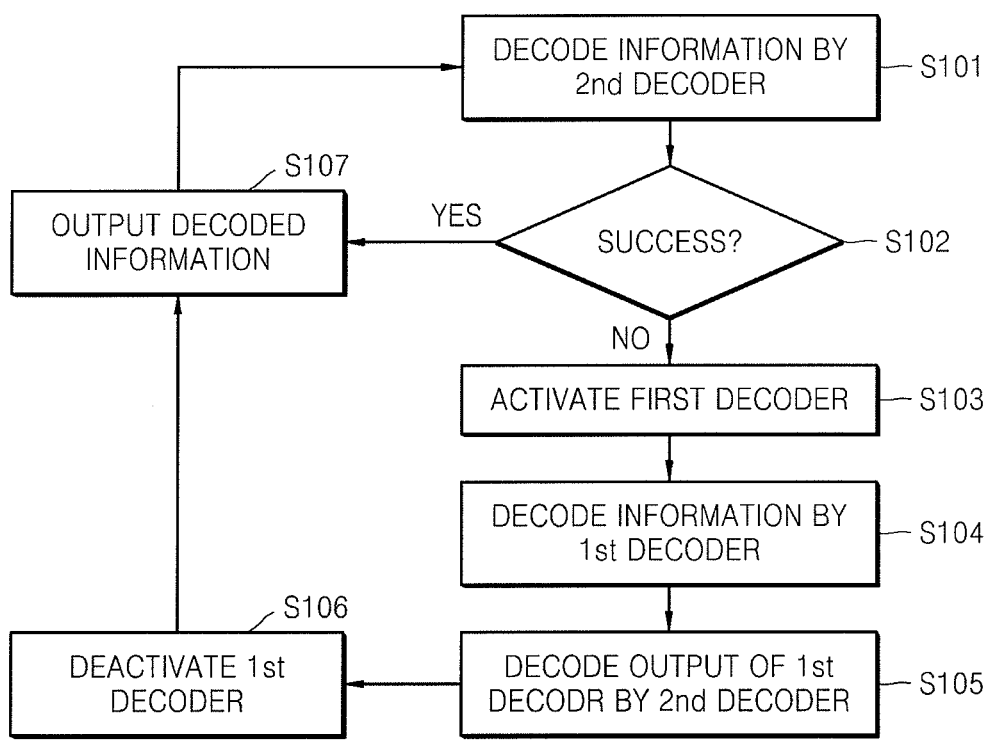
FIG. 15 illustrates a method of operating an ECC circuit according to an exemplary embodiment of the inventive concept.

FIG. 15 illustrates a method of operating an ECC circuit according to an exemplary embodiment of the inventive concept. Referring to FIG. 15, the method includes decoding information by a second decoder of the ECC circuit (S101), determining whether the decoding has been successful (S102), outputting the decoded information if the decoding was successful (S107); however if the decoding was not successful, activating the first decoder of the ECC circuit (S103), decoding the information by the $1^{st}$ decoder (S104), decoding an output of the first decoder by the second decoder (S105), deactivating the $1^{st}$ decoder (S106), and outputting the decoded information (S107). The method can be repeatedly performed as necessary. The second decoder mentioned in the above method could correspond to decoder DECn in FIG. 1, FIG. 4, or FIG. 6, or to the inner decoder InDEC in FIG. 8. The first decoder mentioned in the above method could correspond to the first decoders DEC1, DEC2, . . . , DECn–1 in FIG. 1, FIG. 4, or FIG. 6, or to the outer decoder OutDec in FIG. 8. The method can be variously modified based the operations described above. For example, the controller CTL or the determination unit DPF described above could be used to determine whether the second decoder has performed a decoding successfully. The method may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

A semiconductor device or a memory device as described according to the above exemplary embodiments of the inventive concept may be installed by using various forms of packages, for example, PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), or Wafer-Level Processed Stack Package (WSP).

In a semiconductor device and a decoding method thereof according to at least one embodiment of the inventive concept, when the decoding operation of the final decoder, which outputs finally decoded data, fails, at least one decoder before the final decoder is activated. Also, a plurality of decoders that are sequentially connected to each other may be simultaneously operated. When the decoding operation of the decoder located at the end is successfully performed, operations of other decoders are completed. Thus, an accurate decoding result may be obtained and latency of the plurality of decoders that are sequentially connected to each other may be reduced so that a decoding operation of a semiconductor device may be more rapidly performed and power consumption of the semiconductor device may be reduced.

While the inventive concept has been particularly shown and described with reference to exemplary embodiments thereof, it will be understood that various changes in form and details may be made therein without departing from the spirit and scope of the disclosure.

What is claimed is:

1. An error control coding (ECC) circuit comprising:
    a first decoder receiving encoded data comprising a first parity and a second parity, wherein the first decoder decodes the encoded data to a first code by using the first parity;
    a second decoder connected to the first decoder, wherein the second decoder is configured to decode the encoded data when the first decoder is deactivated and decode the first code output by the first decoder by using the second parity when the first decoder is activated; and
    a controller for transmitting a control signal to the first decoder and the second decoder to control the first decoder and the second decoder.

2. The ECC circuit of claim 1, wherein the control signal activates the first decoder when a decoding operation of the second decoder fails.

3. The ECC circuit of claim 1, wherein the first decoder and the second decoder are simultaneously activated by the control signal.

4. The ECC circuit of claim 3, wherein the controller deactivates the first decoder using the control signal when a decoding operation of the second decoder is successfully performed.

5. The ECC circuit of claim 1, wherein the first decoder decodes a plurality of sub-information of the encoded data in parallel, wherein the plurality of sub-information is obtained by dividing info nation included in the encoded data into distinct parts excluding the parities.

6. The ECC circuit of claim 5, wherein the first decoder comprises a plurality of sub-decoders that decode each of the respective parts of the sub-information.

7. The ECC circuit of claim 6, wherein one of all the sub-decoders are deactivated and at least one of the sub-decoders are activated based on a state of the control signal.

8. The ECC circuit of claim 5, wherein the controller sets the sub-information to be decoded of the plurality of sub-information based on a channel environment parameter.

9. The ECC circuit of claim 5, wherein the controller sets the sub-information to be decoded of the plurality of sub-information, according to a number of error bits included in each of the sub-information.

10. The ECC circuit of claim 1, further comprising a determination unit for determining whether the decoding operation of the second decoder failed or passed.

11. The ECC circuit of claim 1, wherein when a number of error bits of decoded data output from the second decoder is greater than an error correcting capability of the second decoder, the control signal is set by the controller to activate the first decoder.

12. The ECC circuit of claim 1, wherein the first decoder performs a decoding operation by one of soft decision and hard decision and the second decoder performs the decoding operation by one of soft decision and hard decision.

13. The ECC circuit of claim 1, wherein the second decoder decodes the first code when the first decoder is activated in by the control signal, and decodes the encoded data when the first decoder is deactivated by the control signal.

14. A semiconductor device comprising:
    an error control coding (ECC) circuit comprising an encoding unit and a decoding unit,
    wherein the encoding unit generates encoded data by sequentially adding a first parity and a second parity to information,
    wherein the decoding unit comprises:
        a first decoder for receiving encoded data comprising a first parity and a second parity and then decoding the encoded data to a first code by using the first parity;
        a second decoder connected to the first decoder and configured to decode the first code output by the first decoder by using the second parity; and
        a controller for transmitting a control signal to the first decoder and the second decoder that controls the first decoder and the second decoder.

15. The semiconductor device of claim 14, wherein the second decoder decodes the first code when the first decoder is activated by the control signal and decodes the encoded data by using the second parity after removing the first parity from the received encoded data when the first decoder is deactivated by the control signal.

16. The semiconductor device of claim 15, wherein the controller sets the control signal to activate the first decoder when the second decoder fails to decode the encoded data during a previous decoding attempt.

17. The semiconductor device of claim 14, wherein the first decoder decodes a plurality of sub-information of the encoded data in parallel, wherein the plurality of sub-information is obtained by dividing information included in the encoded data into distinct parts excluding the parities.

18. An error control coding (ECC) circuit comprising:
    an encoder comprising an outer encoder and an inner encoder;
    a decoder comprising an outer decoder, an inner decoder, and a controller; and
    a channel enabling communication between the encoder and the decoder,
    wherein the outer encoder receives information from an external source and generates a first encoded code including a second parity and the information, wherein the inner encoder receives the first encoded code and generates a second encoded code including a first parity, the second parity, and the information, wherein the inner decoder receives the second encoded code across the channel and generates a first decoded code by removing the first parity from the second encoded code when activated by a control signal, wherein the outer decoder is configured to decode the first decoded code output from the inner decoder based on the second parity when the first decoded code is received from the inner decoder and decode the first encoded code otherwise, and wherein the controller is configured to set the control signal to activate the inner decoder when the controller receives an indicator signal from the outer decoder indicating a decoding of the outer decoder is a failure and set the control signal to deactivate the inner decoder when the indicator signal indicates that a decoding of the outer decoder current decoding is a success.

19. The ECC circuit of claim 18, further comprising a channel memory connected along the channel, wherein the second encoded code is stored in the channel memory temporarily.

20. The ECC circuit of claim 18, wherein the inner decoder comprises a plurality of decoders that are chained together such that an output of a current one of the decoders is fed as input to a next one of the decoders.

21. The ECC circuit of claim 18, wherein when a number of error bits of decoded data output from the outer decoder is greater than an error correcting capability of the outer decoder, the control signal is set by the controller to activate the inner decoder.

22. The ECC circuit of claim 18, wherein the inner decoder decodes a plurality of sub-information of the first encoded data in parallel, wherein the plurality of sub-information is obtained by dividing information included in the first encoded data into distinct parts excluding the parities.

* * * * *